United States Patent [19]

Oishi et al.

[11] 4,237,520

[45] Dec. 2, 1980

[54] GAS INSULATED SWITCH-GEAR APPARATUS

[75] Inventors: Kazuaki Oishi, Hitachi; Seizo Nakano, Mito; Yutaka Kitano, Hitachi, all of Japan

[73] Assignee: Hitachi, Ltd., Japan

[21] Appl. No.: 966

[22] Filed: Jan. 4, 1979

[30] Foreign Application Priority Data

Jan. 6, 1978 [JP] Japan .................................. 53-14278

[51] Int. Cl.³ .............................................. H02B 1/04
[52] U.S. Cl. .................................... 361/335; 361/333; 361/341; 200/48 R
[58] Field of Search ............. 200/48 R, 148 R, 148 B; 361/331, 332, 333, 335, 341, 342

[56] References Cited

U.S. PATENT DOCUMENTS

| 3,302,069 | 1/1967 | Wilcox | 361/333 |
| 3,378,731 | 4/1968 | Whitehead | 361/333 |
| 4,032,820 | 6/1977 | Oishi | 361/333 |

FOREIGN PATENT DOCUMENTS 46-11312 4/1971 Japan .

*Primary Examiner*—Gerald P. Tolin

*Attorney, Agent, or Firm*—Craig & Antonelli

[57] ABSTRACT

A gas insulated switch-gear apparatus having first and second base planes is disclosed. Arranged on the first and second base planes are feeder switching apparatus comprising gas filled circuit breakers and first and second gas insulated disconnecting switches at opposite sides of each of the gas filled circuit breakers. Gas insulated busbar devices are arranged to be horizontally spaced from the feeder switching apparatus. On the first and second base planes, the first gas insulated disconnecting switches are connected to the gas insulated busbar devices while the second gas insulated disconnecting switches are connected to bushings. Axial lines of the feeder switching apparatus along which the first and second gas insulated disconnecting switches are arranged traverse axial lines of the gas insulated busbar devices. The axial lines of the gas insulated busbar devices arranged on the first and second base planes lie in a common vertical plane containing the axial lines and lie in the base planes. A gas insulated connecting busbar device for interconnecting the gas insulated busbar devices arranged on the first and second base planes is arranged in the common vertical plane such that an axial line thereof traverses the axial lines of the gas insulated busbar devices.

8 Claims, 6 Drawing Figures

GAS INSULATED SWITCH-GEAR APPARATUS

BACKGROUND OF THE INVENTION

The present invention relates to a gas insulated switch-gear apparatus, and more particularly to an improvement of a gas insulated switch-gear apparatus which is suitable for use in a substation of small floor space and which is easy to install, maintain and inspect.

The gas insulated switch-gear apparatus which uses $SF_6$ gas as insulating medium has an advantage of considerable reduction of insulation distance but may require a large floor space depending on a particular arrangement of the apparatus.

Recently, it has become difficult for the substation in which the gas insulated switch-gear apparatus is mounted to assure a wide ground and hence an arrangement of the apparatus which enables considerable reduction of floor space for mounting has been desired.

In order to meet the above requirement, it has been proposed to arrange an apparatus of different one of three phasees on each story of a building, arrange a plurality of circuit breakers between two parallel busbars, and arrange disconnecting switches between th circuit breakers and the busbars and external terminals, respectively so that various distribution networks can be constructed (see U.S. Pat. No. 3,302,069 to Wilcox, or it has been proposed to electrically interconnect electric equipments in a substation including transformers, circuit breakers and disconnecting switches through a ring busbar and accommodate the assembly at different vertical spatial levels of a sectioned building (see U.S. Pat. No. 3,378,731 to Whitehead), or it has also been proposed to provide first and second base phanes arranged in parallel to each other at different vertical spatial levels, on which base planes necessary electric facilities such as circuit breakers are mounted, and arrange a gas insulated busbar between those base planes closely to the second base plane which lies above the first base plane (see Japanese Utility Model Publication No. 11312/71).

Although those proposals can considerably reduce the floor space for mounting by multi-story construction, they still have problems of necessitating much time and manpower for the installation, maintenance and inspection of the apparatus because of the complexity of the arrangement of the electric equipments and the busbars of the respective stories.

SUMMARY OF THE INVENTION

It is an object of the present invention to provide a gas insulated switch-gear apparatus which enables considerable reduction of floor space for mounting and which is very easy to install, maintain and inspect.

The above object of the present invention can be achieved by arranging gas insulated busbar devices which electrically interconnect electric equipments including gas filled circuit breakers and gas insulated disconnecting switches such that the gas insulated busbar devices are horizontally spaced from the electric equipments.

In a preferred form of the present invention, a gas insulated switch-gear apparatus is provided in which a plurality of electric equipments including gas filled circuit breakers and gas insulated disconnecting switches are horizontally arranged on each of first and second base planes which are arranged in parallel to each other at different vertical spatial lines. The gas insulated busbar devices which electrically interconnect the electric equipments are horizontally spaced from the electric equipments and are vertically spaced from each other. The gas insulated busbar devices are interconnected through gas insulated connecting busbar devices.

According to the present invention, since the gas insulated busbar devices are horizontally spaced from the electric equipments, the floor space for mounting can be considerably reduced and the installation, maintenance and inspection of the apparatus are facilitated.

The above and other objects, features and advantages of the present invention will be apparent from the following description of the invention when taken with the accompanying drawings.

DETAILED DESCRIPTION OF THE PREFERRED EMBODIMENTS

Figure 1:
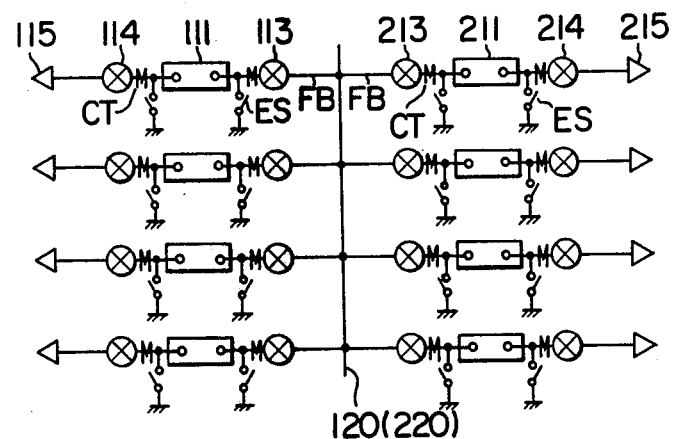
FIG. 1 shows a single-phase circuit diagram of equipments in a conventional substation.

Referring to FIG. 1 shows shows a single-phase circuit wiring diagram, electric equipments or feeder switch-gear apparatus including circuit breakers 111 and 211 and disconnecting switches 113, 114, 213 and 214 arranged therebetween have their first ends connected to a main busbar 120 (229) through feeding busbars FB and the second ends connected to cable heads or bushings 115 or 215. CT designates current transformers and ES designates grounding switches.

Figure 2:
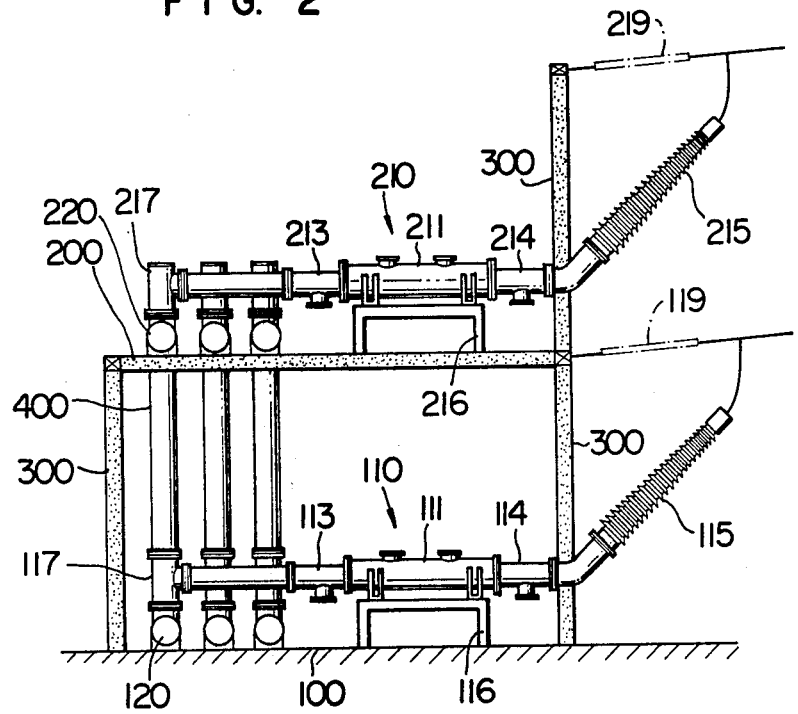
FIG. 2 shows a side elevational view of one embodiment of a gas insulated switch-gear apparatus of the present invention which is constructed to correspond to the single-phase circuit diagram of FIG. 1.

FIG. 2 shows a side elevational view of the gas insulated switch-gear apparatus of the present invention which is constructed to correspond to FIG. 1. First and second base planes 100 and 200 arranged in parallel to each other at differential vertical spatial levels are constructed in two-story construction by a frame 300. The first base plane 100 vertically overlaps with the second base plane 200. A first electric equipment assembly 110, which includes a gas filled circuit breaker 111 and first and second gas insluted disconnecting switches 113 and 114 is mounted on the first base plane, and first gas insulated busbar device 120 is arranged at a position horizontally spaced from the first electric equipment assembly 110. The gas filled circuit breaker 111 includes at least one circuit breaking element having a pair of contacts arranged oppositely to be contacted to each other and separated from each other. The circuit breaking element is horizontally arranged along an axis of make and break of the pair of contacts within a container (not shown) in which insulative quenching gas is filled. The first gas insulated disconnecting switch 113 is connected to one end of the circuit breaking element while the second gas insulated disconnecting switch 114 is connected to the other end of the circuit breaking element. The first and second gas insulated disconnecting switches 113 and 114 are separately and horizontally arranged in containers in each of which insulative quenching gas is filled.

The first gas insulated busbar device 120 is electrically connected to the first gas insulated disconnecting switch 113 of the first electric equipment 110 on the first base plane 100 through a T-shaped connecting container 117. The first gas insulated busbar device 120 includes conductors accommodated in a sheath in which gas is filled. In FIG. 2, the first gas insulated busbar device 120 is of three-phase isolated construction.

The second gas insulated disconnecting switch 114 is connected to the bushing 115 which is held to the frame 300 at a predetermined angle to the first base plane. The gas filled circuit breaker 111 is supported by a rack 116.

A second electric assembly 210 is arranged on the second base plate 200 and supported by a rack 216 at a position corresponding to that on the first base plane 100. The second electric equipment assembly 210 includes a gas filled circuit breaker 211, a first gas insulated disconnecting switch 213 and a second gas insulated disconnecting switch 214. A second gas insulated busbar device 220 is arranged at a position horizontally spaced from the second electric equipment 210. The second gas insulted busbar device 220 is connected to the second electric equipment 220 through a connecting container 217.

The first and second gas insulated busbar devices 120 and 220 are electrically interconnected through a gas insulated connecting busbar device 400 which comprises conductors accommodated within a sheath in which insulative quenching gas is filled.

Figure 3:
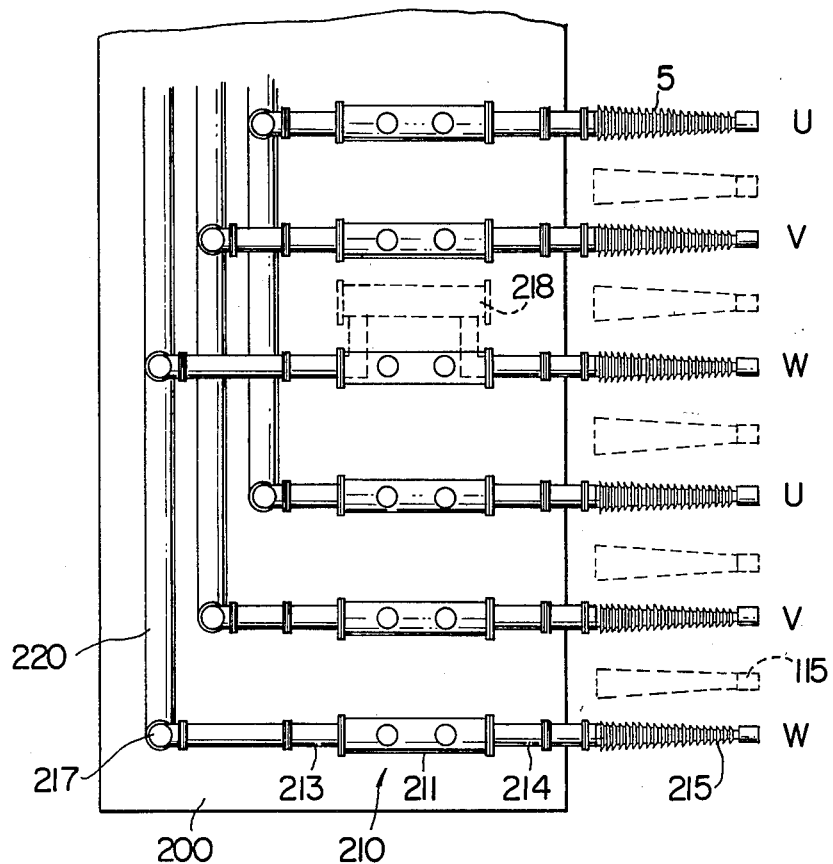
FIG. 3 shows a plan view of FIG. 2.

FIG. 3 shows a plane view of FIG. 2 for illustrating a plan view of the second base plane. The relation between the gas insulated busbar devices and the electric equipments is explained with reference to FIG. 3. The gas insulated busbar device 220 is electrically connected to the electric equipment 212 on the second base plane 200. The gas filled circuit breaker 211 and the gas insulated disconnecting switches 213 and 214 of the electric equipment 210 are coaxially arranged on the base plane. The gas insulated busbar device 220 is arranged so that the axial line thereof traverses the axial line of the electric equipment 210.

A relation between the first base plane 100 and the second base plane 200 is such that vertical projections of the axial lines of the electric equipment and the gas insulated busbar device on one base plane onto the other base plane coincide with the axial lines of the electric equipment and the gas insulated busbar device on the other base plane.

As shown by dotted line in FIG. 3, the gas filled circuit breaker 218 may be arranged on an axial line other than the axial line connecting the gas insulated busbar 220 to the bushing 215. In this case, the vertical projections of the axial lines of the electric equipment and the gas insulated busbar device on one base plane onto the other base plane partially overlap the axial lines of the electric equipment and the gas insulated busbar device on the other base plane.

As described above, in accordance with the present embodiment, the first and second base planes are provided, on which feeder switching apparatus comprising the gas filled circuit breakers and the first and second gas insulated disconnecting switches is arranged. The gas insulated busbar devices are arranged at the positions horizontally spaced from the feeder switching apparatus. On the first and second base planes, the first gas insulated disconnecting switch is connected to the gas insulated busbar device while the second gas insulated disconnecting switch is connected to the bushing. The axial line of the feeder switching apparatus along which the first and second gas insulated disconnecting switches are arranged transverses the axial line of the gas insulated busbar device.

The axial lines of the gas insulated busbar devices arranged on the first and second base planes, respectively, are positioned in a common vertical plane including those axial lines and in the respective base planes. The gas insulated connecting busbar device is arranged such that the axial line thereof lies in the common vertical plane and traverses the axial line of the gas insulated busbar device.

While the upper and lower busbar devices 120 and 220 are shown to be connected through the connecting busbar device 400 at the end of the busbar device 220, the connecting busbar device 400 may be connected to any other point. The gas insulated equipments described above are housed in containers in which insulative medium such as $SF_6$ gas is filled as is the case of the gas filled circuit breaker, with the equipments being insulated from the containers to form charging portions.

As described above, according to the present embodiment, the floor space for mounting the equipments can be considerably reduced since the electric equipments 110 and 210 are mounted on the first and second base planes 100 and 200. Furthermore, since the busbar devices 120 and 220 are horizontally spaced from the electric equipments 110 and 210, they can be easily installed, maintained and inspected without being affected by other apparatus or equipments.

As shown in FIG. 3, in the feeder switching apparatus arranged on the first and second base planes 100 and 200, the gas insulated disconnecting switch 213 connected to one end of the gas filled circuit breaker 211 is connected to the gas insulated busbar device 220 with their axial lines intersecting to each other while the other disconnecting switch 214 is connected with the bushing 215. The feeder switching apparatus are horizontally arranged on the second base plate 200 and also arranged in parallel to construct a phase isolated configuration horizontally to the axial line of the gas insulated busbar device 220. The feeder switching apparatus on the first base plane 100 are also arranged in the same manner as the feeder switching apparatus on the second base plane 200, and each of the feeder switching apparatus is positioned in the same vertical plane on the base plane 100 or 200. That is, the gas filled circuit breakers and the gas insulated disconnecting switches are arranged on the first and second base planes on the axial lines connecting the gas insulated busbar devices 120 and 220, respectively, to the bushings 115 and 215, respectively.

By arranging the electric equipments in the manner described above, the arrangements of the gas insulated busbar devices and the electric equipments can be definitely sectioned in the horizontal plane and the electric equipments such as the gas filled circuit breakers can be horizontally arranged at the same position on the first and second base planes. Consequently, the floor space for mounting the electric equipments can be considerably reduced and the total height of the equipments can be reduced. Furthermore, the installation, maintenance and inspection of a single gas insulated busbar device or a single electric equipment can be easily made without affecting the other devices and equipments and without being affected by other devices and equipments. Accordingly, the installation of additional feeder switching apparatus on the base planes is also facilitated.

The above concept of the present invention can also be applied to combined three-phase busbar devices or combined three-phase gas filled circuit breakers.

The feeder switching apparatus include line switching apparatus to be connected to transmission lines and bank switching apparatus to be connected to transformers. When all of the line switching apparatus as the feeder switching apparatus are arranged in parallel on one base plane, e.g. the base plane 200 in FIG. 2 and all of the bank switching apparatus as the feeder switching apparatus are arranged in parallel on the base plane 100, the feed-in and the feed-out to and from the bushings 115 and 215 are facilitated very much. This arrangement is advantageous particularly when cables are used instead of the bushing 115 because the level of the base plane 200 can be reduced.

When the bushings 115 and 215 are used in the above arrangement, insulation distance in gas may pose a problem but it can be resolved by arranging the bushings 115 and 215 at a predetermined angle to the base planes as shown in FIG. 2. In this case, leads from the bushings may be supported by insulators 119 and 219 having their ends fixed to the frame 300 or a wall. Alternatively, as shown by broken line in FIG. 3, the bushings 215 of the feeder switching apparatus mounted on the upper base plate 200 and the bushings 115 of the feeder switching apparatus mounted on the lower base plate 100 may be axially displaced from the busbar device 200 so that the bushings 115 are positioned between the bushings 215. With this arrangement, insulation distance in gas between the adjacent bushings can be increased and the level of the upper base plane 200 can be lowered.

If the feeder switching apparatus on the lower base plane 100 is also displaced to conform to the arrangement of the bushings 115, the axial length of the lower busbar device 120 must be increased because of the connecting busbar device 400 and hence the arrangements on the respective base planes must be changed. In this case, therefore, it is desirable to bend the container between the disconnecting switch and the bushing 115.

Alternatively, the distance between the disconnecting switches 114 and 214 arranged on the side of the bushings and the bushings 115 and 215 may be changed to mount the bushings vertically, or the other disconnecting switches may be arranged in the container 217 so that the bushings 115 are displaced leftward and mounted vertically. In this case, the disconnecting switches may be arranged in a bushing pocket (a lower container of the bushing).

Those modifications of the bushing arrangement can further simplify the arrangement of the gas insulated switching apparatus of the present invention in which the busbar devices 120 and 220 are arranged on one of the base planes 100 and 200 and the electric equipments and the busbar devices are separated on the horizontal planes and at different vertical spatial levels.

As is apparent from the above description, according to the preferred embodiment of the present invention, a plurality of electric equipments including the gas filled circuit breakers and the gas insulated disconnecting switches are horizontally arranged on two base planes arranged in parallel to each other at different vertical spatial levels, and the gas insulated busbar devices are arranged in parallel to each other on one side of the base plates with the gas insulated busbar devices being interconnected by the gas insulated connecting busbar device. In this manner, the arrangement of the electric equipments and the arrangement of the busbar devices are separated from each other on horizontal plane and at different vertical spatial levels so that the floor space for mounting can be considerably reduced and the installation, maintenance and inspection of the equipmetns are very much facilitated.

Figure 4:
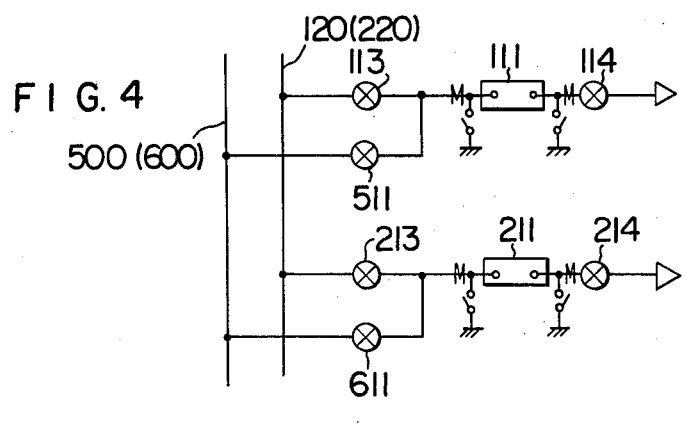
FIG. 4 shows a single-phase wiring diagram illustrating another embodiment of a configuration of the substation.

FIG. 4 shows a circuit wiring diagram of a dual busbar system, which includes, in addition to the configuration of FIG. 1, a second busbar device 500 (600) which is parallel to the busbar device 120 (220), and disconnecting switches 511 and 611 which are connected in parallel with disconnecting switches 113 and 213, respectively, between the busbar device 500 (600) and the circuit breakers 111 and 211, respectively.

Figure 5:
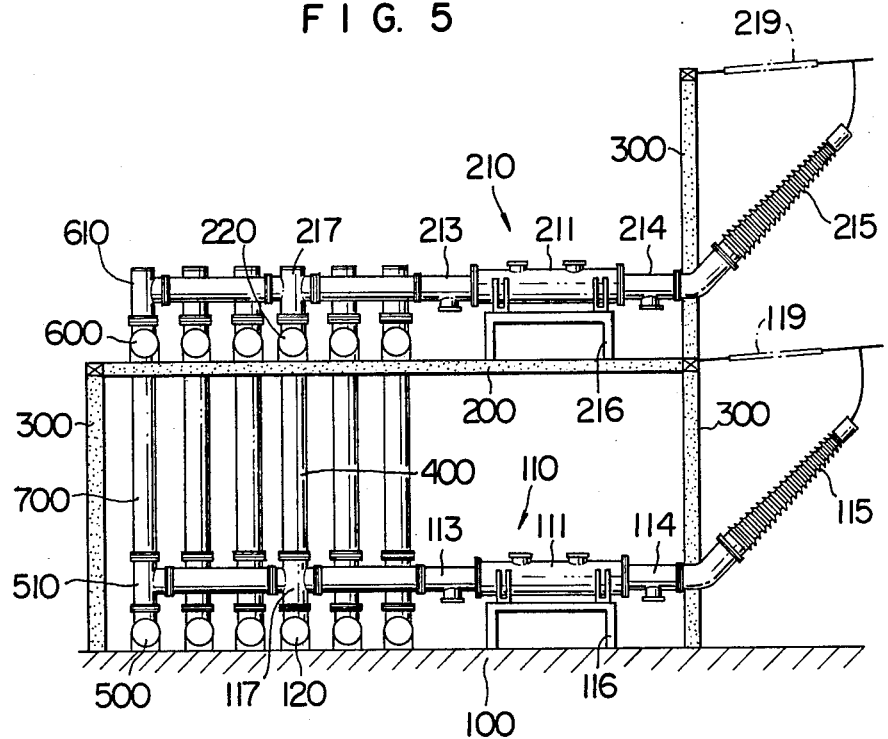
FIG. 5 shows a side elevational view of another embodiment of the gas insulated switch-gear apparatus of the present invention which is constructed to correspond to the single-phase wiring diagram of FIG. 4.

FIG. 5 shows a side elevational view of another embodiment of the gas insulated switch-gear apparatus of the present invention which is constructed to correspond to the circuit wiring diagram of the dual busbar system shown in FIG. 4. In the arrangement shown in FIG. 5, the second gas insulated busbar devices 500 and 600 are arranged adjacent to the gas insulated busbar devices 120 and 220, respectively, which are arranged on the base planes 100 and 200. The axial lines of the second gas insulated busbar devices 500 and 600 are parallel to the axial lines of the gas insulated busbar devices 120 and 220. The second gas insulated busbar devices 500 and 600 are electrically interconnected by a second gas insulated connecting busbar device 700.

Figure 6:
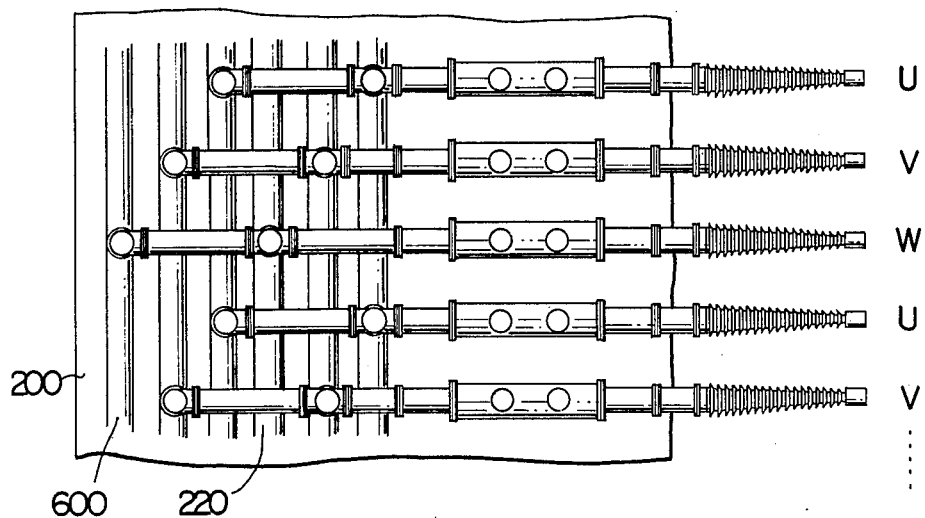
FIG. 6 shows a plan view of FIG. 5.

With this arrangement, the dual busbar system gas insulated switch-gear apparatus can be readily attained. In the present embodiment, like in the embodiment of FIG. 2, the feeder switching apparatus horizontally arranged on the base planes 100 and 200 are connected to the busbar devices 120, 220, 500 and 600 through the connecting containers 117, 217, 510, 610 so that they traverse the axial lines of the busbar devices as shown in FIG. 6. A plurality of feeder switching apparatus are arranged in parallel in phase-separated construction along the axial line of the busbar devices on the base planes 100 and 200, as described above. Additional disconnecting switches 511 and 611 are housed in connecting containers 510 and 610.

Thus, in accordance with the present invention, since the gas insulated busbar devices are horizontally spaced from the electric equipments and they are vertically spaced from each other, the floor space for mounting is considerably reduced and the installation, maintenance and inspection of the equipments are facilitated.

In one example of a 500 kV class gas insulated switch-gear apparatus, the height of the equipments is as high as 3–4 meters.

As described above, according to the present invention, the busbar devices are arranged on one side of the base planes of the multi-story construction, the busbars on the respective base planes are electrically interconnected through the connecting busbar devices, and the electric equipments which include the gas filled circuit breakers and the disconnecting switches are arranged on the horizontal planes which are normal to the busbar devices. Consequently, the floor space for mounting can be considerably reduced and the installation, maintenance and inspection of the equipments are very much facilitated. Furthermore, the standarization of the equipments for the single busbar system and the dual busbar system can be attained.

What is claimed is:

1. A gas insulated switch-gear apparatus comprising a plurality of base planes arranged in parallel to each other at different vertical spatial levels, at least one gas insulated main busbar device arranged on each one of said base planes and having a substantial length extending in a predetermined first direction, at least one electrical equipment assembly having a gas insulated circuit breaker and at least one gas insulated disconnecting switch arranged on each one of said base planes in a second direction substantially perpendicular to said first direction and disposed separately from said main busbar device via a predetermined distance on one side of said main busbar device, at least one feeding busbar device arranged on each one of said base planes and having a substantial length extending in said second direction and connecting said electrical equipment assembly to said main busbar device, and at least one gas insulated connecting busbar device interconnecting said main busbar devices arranged on adjacent ones of said base planes.

2. A gas insulated switch-gear apparatus comprising a plurality of base planes arranged in parallel to each other at different vertical spatial levels, electrical equipment assemblies arranged on each one of said base planes, each of said electrical equipment assemblies including a gas insulated circuit breaker and a gas insulated disconnecting switch assembly, each of said gas insulated circuit breakers including at least one circuit breaking element having a pair of opposing contacts capable of being closed and opened, each said circuit breaking element being arranged along an axial line of make and break of said contacts and accommodated horizontally within a container filled with insulative quenching gas, each of said gas insulated disconnecting switch assemblies including a first gas insulated disconnecting switch connected to one end of each said circuit breaking element and a second gas insulated disconnecting switch connected to the other end of said circuit breaking element, said first and second gas insulated disconnecting switches being separately and horizontally accommodated in respective containers filled with insulative quenching gas, and gas insulated busbar devices electrically interconnecting said electrical equipment assemblies on said base planes, each of said gas insulated busbar devices having conductors accommodated within a sheath filled with insulative quenching gas, said gas insulated busbar devices being horizontally spaced from corresponding ones of said electric equipment assemblies and vertically spaced from each other, said gas insulative busbar devices being electrically interconnected through a gas insulated connecting busbar device having conductors accommodated within a sheath which is filled with insulative quenching gas.

3. A gas insulated switch-gear apparatus according to claim 2, wherein said electrical equipment assemblies are arranged to one side of said base planes and said gas insulated busbar devices are arranged on the other side spaced from said one side.

4. A gas insulated switch-gear apparatus according to claim 2 or claim 3, wherein said gas insulated busbar devices are electrically connected to said electrical equipment assemblies on said base planes, said electrical equipment assemblies are arranged such that the gas filled circuit breakers and the gas insulated disconnecting switches of said electrical equipment assemblies are positioned on the same axial line on said base planes, and said gas insulated busbar devices are arranged such that axial lines thereof traverse the axial lines of said electrical equipment assemblies.

5. A gas insulated switch-gear apparatus according to claim 4, wherein the axial line of each said electrical equipment assembly and the axial line of each said gas insulated busbar device on one of said base planes coincide with the axial line of each said electrical equipment assembly and the axial line of each said gas insulated busbar device on the other base plane, respectively, when viewed in a direction perpendicular to said base planes.

6. A gas insulated switch-gear apparatus according to claim 4, wherein one of the axial line of each said electrical equipment assembly and the axial line of each said gas insulated busbar device on one of said base planes coincides with the corresponding one of the axial line of each said electrical equipment assembly and the axial line of said gas insulated busbar device on the other base plane, when viewed in a direction perpendicular to said base planes.

7. A gas insulated switch-gear apparatus according to claim 2, wherein said plurality of base planes includes first and second base planes on which feeder switching apparatus comprising said gas filled circuit breakers and said first and second gas insulated disconnecting switches are arranged, said gas insulated busbar devices being horizontally spaced from said feeder switching apparatus, said first gas insulated disconnecting switches being connected to said gas insulated busbar devices while said second gas insulated disconnecting switches are connected to bushings on said first and second base planes, axial lines of said feeder switching apparatus along with said first and second gas insulated disconnecting switches being arranged traverse the axial lines of said gas insulated busbar devices, and wherein the axial lines of said gas insulated busbar devices arranged on said first and second base planes lie in a common vertical plane which contains the respective axial lines and also lie in the respective base planes, and said gas insulated connecting busbar device being arranged in said common vertical plane such that the axial line thereof traverses the axial lines of said gas insulated busbar devices.

8. A gas insulated switch-gear apparatus according to claim 2 or claim 7, wherein further gas insulated busbar devices are arranged adjacent to said first-mentioned gas insulated busbar devices which are arranged on said base planes, the axial lines of said further gas insulated busbar devices being parallel to the axial lines of said first-mentioned gas insulated busbar devices, and said further gas insulated busbar devices being electrically interconnected through a further gas insulated connecting busbar device.

* * * * *

UNITED STATES PATENT AND TRADEMARK OFFICE
CERTIFICATE OF CORRECTION

PATENT NO. : 4,237,520
DATED : December 2, 1980
INVENTOR(S) : Kazuaki Oishi et al It is certified that error appears in the above—identified patent and that said Letters Patent is hereby corrected as shown below:

Title Page, Item [30], Priority Data 53-14278 is incorrect. Should read :

--53-142--

Signed and Sealed this

Twenty-eighth Day of April 1981

[SEAL]

Attest:

RENE D. TEGTMEYER

Attesting Officer

Acting Commissioner of Patents and Trademarks